Feb. 2, 1954
C. C. CHELF
2,668,094
VEHICLE OPERATION RECORDER WITH SLOW SPEED COMPENSATOR
Filed March 8, 1951
3 Sheets-Sheet 1
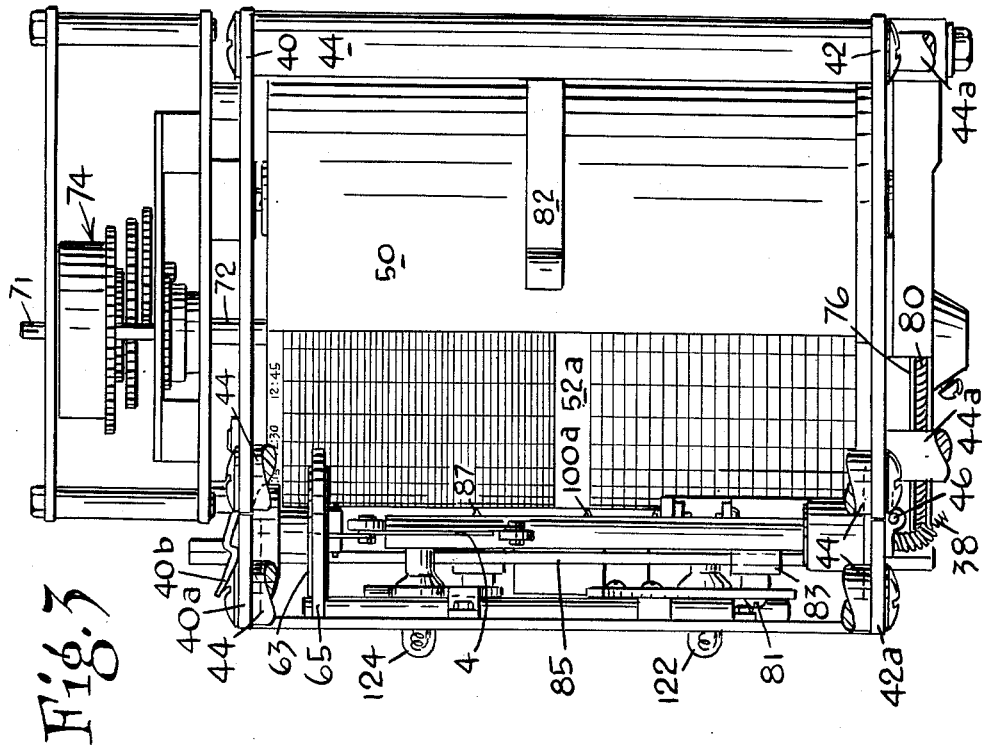
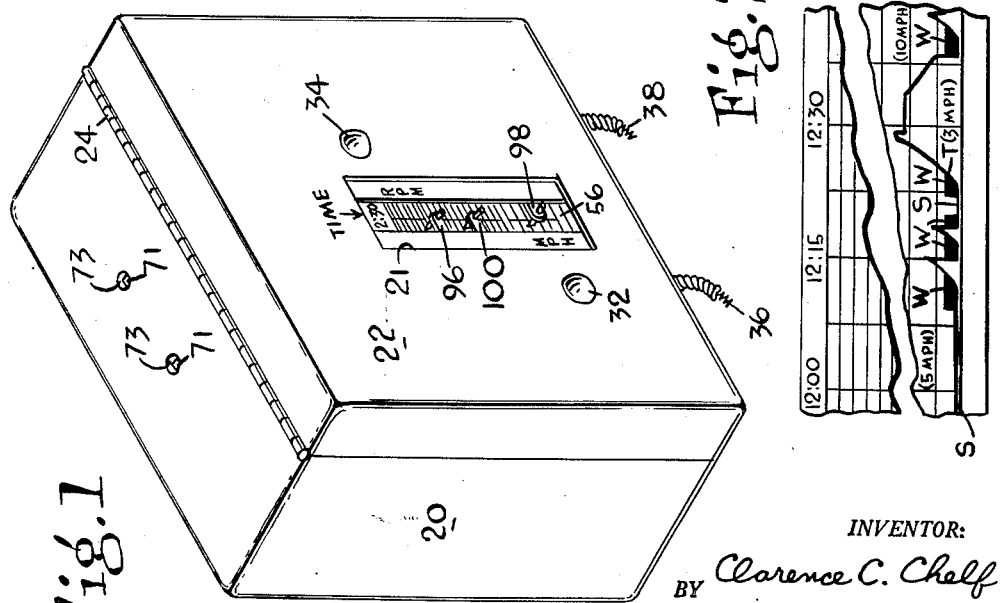
INVENTOR:
BY Clarence C. Chelf
Leech + Radue
Attorneys Feb. 2, 1954 C. C. CHELF 2,668,094
VEHICLE OPERATION RECORDER WITH SLOW SPEED COMPENSATOR
Filed March 8, 1951 3 Sheets-Sheet 3
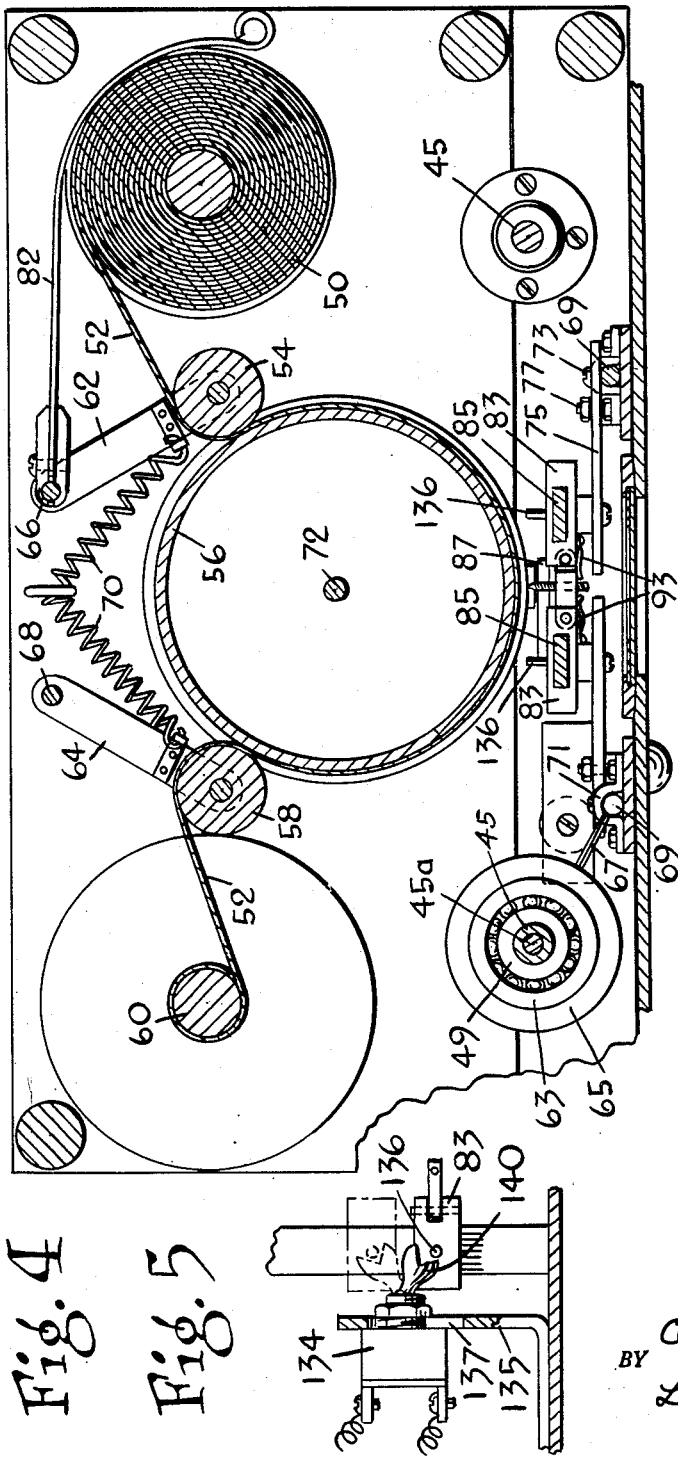
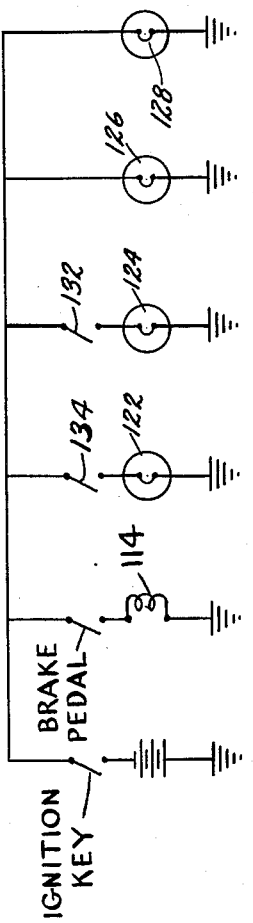
INVENTOR:
Clarence C. Chelf
BY Leech & Radue
Attorneys Patented Feb. 2, 1954

2,668,094

UNITED STATES PATENT OFFICE 2,668,094

VEHICLE OPERATION RECORDER WITH SLOW SPEED COMPENSATOR

Clarence C. Chelf, Lebanon, Ky.

Application March 8, 1951, Serial No. 214,510

5 Claims. (Cl. 346—73)

The present invention relates generally to apparatus for graphically recording the operations of motor vehicles, and more particularly to an apparatus which will record such details of normal vehicle operation as motor racing, coasting of the vehicle, the particular gear ratios, braking, etc., and the time and the duration of each such occurrence.

The invention of this application is illustrated as improvements on the basic apparatus disclosed and claimed in a copending joint application of Ralph C. Moffitt and of Clarence C. Chelf (the applicant herein) S. N. 157,128, filed April 20, 1950 (now Patent No. 2,584,149 of February 5, 1952,) as a continuation of application S. N. 647,251, filed February 13, 1946, and abandoned. Only so much of the disclosure of said joint application as will be necessary for a full understanding of the present invention, will be described herein. Reference may be made to the said patent for a more complete disclosure of the construction, operation and advantages of such a recorder.

The problem to which this invention is particularly addressed is that of providing a vehicle operation recorder that will respond to very low vehicle or engine-idling speeds and thus making it possible to distinguish between such speeds and a full-stop or zero speed. This disclosure includes a device ("wobbler") for clearly differentiating between zero and near-zero speeds.

The disclosed mechanical embodiment produces a unitary recorder which is compact yet easily serviceable.

It is accordingly an object of this invention to provide a speed indicator and/or recorder which will clearly differentiate between zero and extremely low speeds.

It is a further object of the present invention to provide a unitary recorder which is both compact and also easy to service.

Other objects and advantages will become apparent during the course of the following description.

In the drawings, which show a preferred embodiment of the invention:

Fig. 1 is a perspective view of the apparatus ready to be mounted in the driver's compartment of a vehicle or the like;

Fig. 3 is a side elevational view looking from the right in Fig. 2;

Fig. 4 is a sectional plan view taken on the line 4—4 of Fig. 2;

Fig. 5 is a detailed elevational view of one of the signal-lamp switches;

Fig. 6 is a diagrammatic showing of the electric circuit of the apparatus as incorporated in the regular vehicle circuit; and Fig. 7 is a fragmentary view to an enlarged scale of an illustrative vehicle-speed record.

Figure 2:
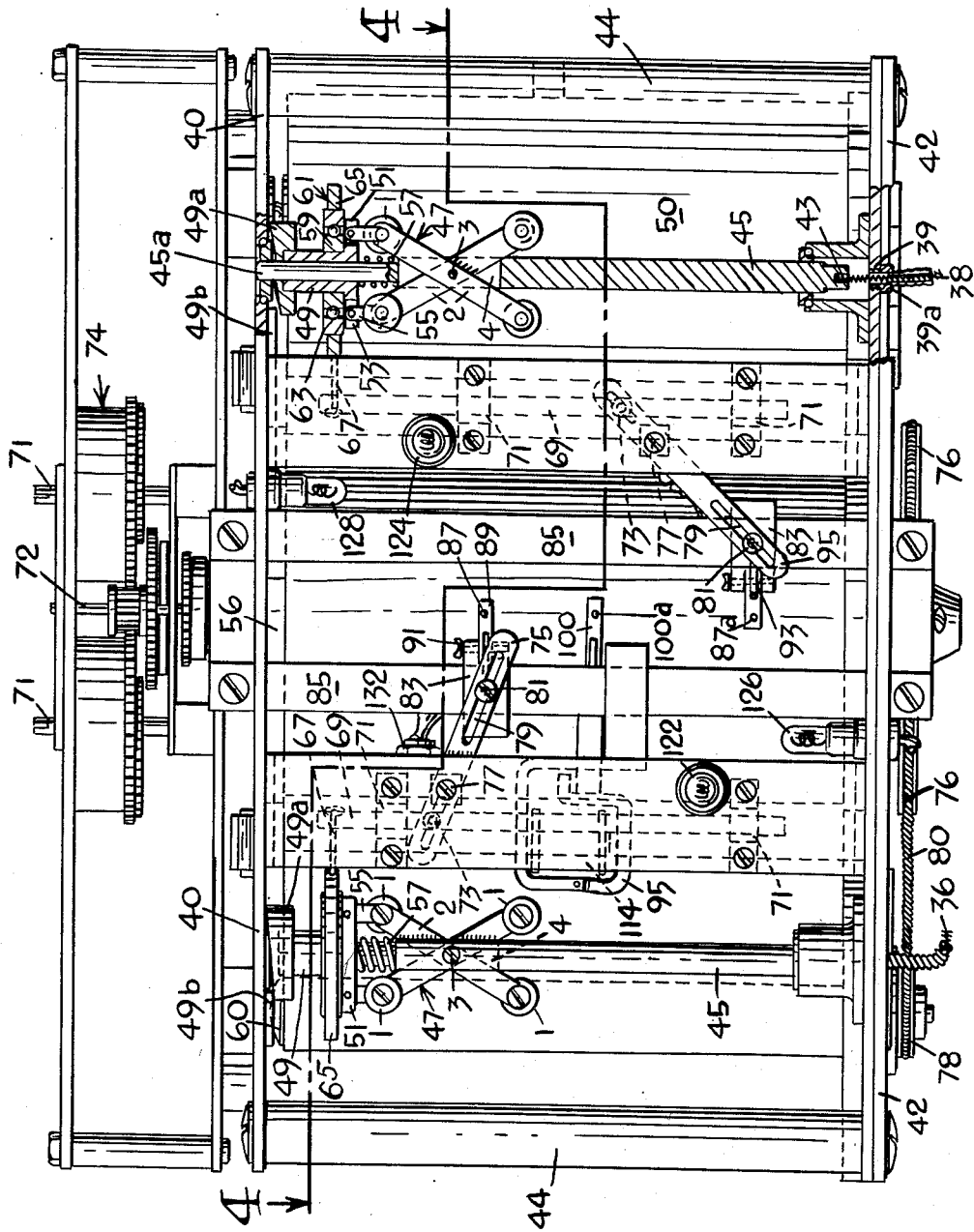
Fig. 2 is a front elevational view, partly in section, of the apparatus, with the case removed.

With reference now to the drawings, the numeral 20 designates the case enclosing the apparatus and having a cover 22, hinged as at 24 for a purpose to be described. The cover 22 is provided with a central vertically elongated window-forming aperture 21, which permits observation of the movement of the recording cylinder 56, and the M. P. H., and the R. P. M. recording stylus-carrying arms 96 and 98, and a braking recording stylus-carrying arm 100. The time may be read from the uppermost part of the recording web, as indicated by the arrow under "Time" above the aperture 21.

The brake-actuated recording stylus-arm 100 is located intermediate the vertical sliding paths of the M. P. H. and R. P. M. stylus arms, each of which paths extends less than half the height of the recording cylinder 56. A pair of red-glass-covered apertures 32 and 34 may be provided in the cover 22 and are illuminated by lamps 122 and 124 whenever the M. P. H. or R. P. M. of the vehicle or its motor exceeds that for which the apparatus is set, according to the wishes of the owner.

The case 22 may be attached by any suitable means to the vehicle dash or other support, and is connected by flexible armored (coil-spring type) shafts 36 and 38 to the crank shaft of the engine and to the drive shaft from the transmission, to be responsive to motor speed and to vehicle speed, respectively.

The electrical system is connected to the regular battery circuit and need not be locked (as is the case 20) against tampering by the driver (or other unauthorized persons). Since the visible stylus-arms and the signal lamps warn the driver of improper operation, his temptation to tamper is considerably lessened.

The apparatus comprises a pair of supporting plates 40 and 42 spacedly joined by end leg members 44. The lower plate may be supported from the bottom of the casing 20 by any suitable means, such as posts 44a (Fig. 3). It will be noted that the forward portion of the plates 40 and 42 and their spacing supporting legs 44 are adapted to be pivoted forwardly, as a unit, about the hinge 46, so as to provide ready access to the paper-supporting cylinder 56 and spools 60. Spring latch 40b releasably holds the portions 40 and 40a in abutting relationship.

A roll 50 of waxed recording paper 52, ruled as shown in Figs. 3 and 7, is rotatably journalled between plates 40 and 42 at the right of the apparatus (Fig. 4), and the web 52 is fed around the idler roller 54, around the front of the recording cylinder 56, around and behind an idler roller 58, and thence around a take-up roll 60. The idler rollers 54 and 58 are supported by arms 62 and 64, pivoted on vertical axes 66 and 68, and are constrained to press the paper web 52 against cylinder 56, by the connecting tension spring 70, so as to prevent any slipping of the record paper on the cylinder 56.

The recording cylinder 56 is mounted on a shaft 72, which is driven by a clock-work motor 74 mounted on the plate 40. The lower end of the shaft 72 supports a large pulley 76 (Figs. 2 and 3), which drives a smaller pulley 78 on the lower end of the shaft of take-up roller 60, by means of a spring or other flexible drive belt 80. The clock motor is wound by a key engageable over squared shafts 71 accessible through openings 73 in the top of casing 20.

A tensioning and braking spring-arm 82 is adjustably mounted on pivot 66 to bear against the recording paper roll 50 to prevent any slackening of the web 52 as it approaches the idler roll 54.

It will be apparent that as the clock motor 74 drives the recording cylinder 56, the paper web 52 will move about its surface with a linear speed which will cause one vertical line of the ruled web to pass a given point (the arrow "Time" indicator on the cover 22) every five minutes. The take-up roller 60, being driven by the belt 80, maintains the web 52 taut on leaving the roller, and the frictional resistance between the web and the cylinder 56 is thus sufficient to prevent slipping therebetween.

The flexible shafts 36 and 38 pass through threaded sleeves 39 mounted in openings in the hinged front portion 42a of the plate 42 and have squared upper ends 43 received in mating recesses in the lower end of the shafts 45 of the speed-responsive devices generally designated as 47. A threaded cap 39a may be employed to clasp the armor sheath for the shaft 38 to the sleeve 39.

The placing of one or both of the speed-responsive devices 47 within the casing 20 is an important practical improvement in the Moffitt and Chelf patent mentioned above.

Each speed-responsive device 47 is disclosed as being of the centrifugal or "fly-ball" type and consists of weights 1 carried at the ends of cross-arms 2. The arms or movable members 2 are pivoted about their center points on pins 3 passing perpendicularly through the axes of the shafts 45 so as to hold the arms in the diametrical and axial slots 4. The shafts 45 above the slots 4 have a reduced-diameter extension 45a upon which there is vertically slidably mounted a thrust-sleeve member 49, outwardly flanged at its bottom at 51. The flange 51 has vertically extending radial slots 53 which receive connecting links or rods 55 by which the sleeve 49 is pulled down against the force of compression spring 57 as the fly-balls swing away from the shaft 45 due to increasing centrifugal force with increasing speed of rotation of said shafts. Press-fitted on the sleeve 49 and abutting the upper surface of its flange 51 is the inner ring-shaped race 59 of the ball-bearing member 61. The outer ring-like race 63 of said bearing is mounted in a vertically movable but non-rotating ring-like member 65, having a horizontally extending arm 67 for imparting vertical movement to the speed-responsive stylus. The arm 67 is connected to a vertically reciprocating rod 69 held in guides 71. Each rod 69 carries a pin 73 for operating the stylus-moving rocker arms 75 about the pivot-pins 77. The rocker arms 75 have elongated slots 79 which engage over pins 81 to move the stylus-carrying slides 83. Slides 83 are vertically slidable on the track-like guides 85. The upper of the two slides 83 carries a threadedly adjustable stylus 87 mounted in a bore in arm 89, which is swingable about pivot pin 91 and is yieldably urged toward the recording drum by a spring 93. The stylus 87 engages the drum 56, or rather the web 52 stretched thereover, in the R. P. M. portion of the web (Figs. 1 and 3). The lower slide member 83 is similarly constructed and carries a stylus 87a which engages the M. P. H. portion of the web. Where greater compactness is desired the two styluses 87 and 87a may be mounted for vertically slidable movement along spaced sections of a single guide 85.

To produce a "wobbling" of the stylus when the M. P. H. or R. P. M. speeds are too slow to move the fly-balls from their zero positions, a disk-shaped cam 49a is press-fitted or otherwise fastened to the top of sleeve 49. The beveled or inclined upper face (the throw of which is exaggerated for illustration) engages the "bumper" or cam-follower 49b fixedly attached to frame plate 40 by any suitable means (not shown).

The blank space 52a (Fig. 3) between the two ruled portions of the web 52 receives the brake-application record produced by the stylus-carrying arm 100. This stylus-carrying arm is mounted on a swingable armature 95, which in turn is operated by a solenoid 114 connected in series with a brake-pedal-operated switch, as shown schematically in Fig. 6. The details of construction and the mode of operation of this recorder of the braking action are described at length in the Moffitt and Chelf patent referred to above.

Fig. 6 discloses the basic circuit employed in the disclosed apparatus. Lamps 126 and 128 shown in Fig. 2 are for illuminating the web so that the positions of the stylus-carrying arms can be observed through the window 21 in the cover 22. The lamps 122 and 124 are warning signals energized respectively by switches 134 and 132 (Figs. 2 and 5) which are closed automatically when the R. P. M. or the M. P. H. exceed maxima selected by the owner of the vehicle.

Fig. 5 shows the switch 134 mounted on a bracket 135 and vertically adjustable in a slot 137 therein. The operating lever 140 of the switch is provided with a notch into which pin 136 on the slide 83 engages to close or open the switch as the speed being recorded by the stylus-carrying slide 83 rises above or drops below the maximum value chosen.

Fig. 7 shows an enlarged portion of an M. P. H. record produced by using the "wobbler" feature of this invention to give a clear picture of the exact operation of the vehicle at extremely low speeds, as for example in "inching along" in heavy traffic. The portions of the curve marked S show that the vehicle was not in motion. The heavy blocked areas W indicate that the vehicle was in motion since such a heavy line could only be produced by the wobbling action produced by the wobbler cam. As the speed rises above 3

M. P. H. as at T the fly-balls have moved sleeve 49, and the wobbler cam 49a carried thereby, sufficiently far downwardly away from the bumper 49b, to reduce the wobbling effect to zero, so that the line above that speed is a normal fine line not widened by the wobbling action that occurs between zero and 3 M. P. H. Of course, a smaller throw may be chosen for the cam to lessen wear of the moving parts, it being merely necessary that the wobble-produced line be distinguishably thicker than the normal stylus mark.

While a preferred embodiment of the invention has been shown and described in detail, it is to be understood that various changes can be made in arrangement of parts and details of construction without departing from the principles of the invention and the scope of the appended claims.

Having thus described the invention, what I claim as novel and desire to secure by Letters Patent of the United States is:

1. In a vehicle operation recorder, a frame, a shaft supported in the frame for axial rotation, a rotational-speed-responsive means secured on the shaft and having a member movable in response to variations in the speed of rotation of the shaft, a thrust-sleeve member slidable on the shaft, link means connecting the inner end of the thrust-sleeve member to the said movable member, resilient means arranged to separate said thrust-sleeve and movable members, a cam plate having an inclined surface secured to the outer end of the thrust-sleeve member for rotation therewith, cam follower means fixedly supported by the frame for operative engagement with the cam plate when not held spaced therefrom by operation of said movable member of the rotational speed-responsive device, a stylus adapted to move over a recording surface, and operative connections between the thrust-sleeve member and the stylus.

2. In a vehicle operation recorder, a frame, a shaft supported in the frame for axial rotation, a rotational-speed-responsive means secured on the shaft and having a member movable in response to variations in the speed of rotation of the shaft, a thrust-sleeve member slidable on the shaft, link means connecting the inner end of the thrust-sleeve member to the said movable member, a compression spring mounted on the shaft and arranged to separate said thrust-sleeve and movable members, a wedge-shaped cam plate mounted on the outer end of the thrust-sleeve member for rotation therewith, cam follower means fixedly supported by the frame for operative engagement with the cam plate when not held spaced therefrom by operation of said movable member of the rotational speed-responsive device, a stylus adapted to move over a recording surface, and operative connections between the thrust-sleeve member and the stylus.

3. In a vehicle operation recorder, a frame, an elongated shaft mounted in the frame for axial rotation, a fly-ball type speed responsive device having its arms pivotally mounted on an intermediate portion of said shaft for rotation therewith, a thrust-sleeve member slidable on said shaft, a link connecting each arm of the fly-ball type device to opposite sides of the thrust-sleeve member, said shaft being provided with an abutment between the point of pivotal mounting of the fly-ball arms and the adjacent end of the thrust-sleeve, compression spring means acting between the thrust-sleeve member and the shaft abutment, an inclined face cam secured on the other end of the sleeve member, a fixed cam follower engageable by the inclined face of the cam to reciprocate the sleeve member upon rotation of the shaft, and a stylus adapted to operate on a recording surface and connected with the sleeve member for responsive oscillation.

4. In a vehicle operation recorder, an elongated shaft, fixed bearing means receiving opposite end portions of the shaft for axial rotation, a fly-ball type speed responsive device having its arms pivotally mounted on an intermediate portion of said shaft for rotation therewith, a thrust-sleeve member slidable on said shaft between the adjacent fixed bearing means and the fly-ball type device, a rod connecting each arm of the fly-ball type device to opposite sides of the thrust-sleeve member, said shaft being provided with an abutment between the point of pivotal mounting of the fly-ball arms and the adjacent end of the thrust-sleeve, compression spring means acting between the thrust-sleeve member and the shaft abutment, a beveled disk cam secured on the other end of the sleeve member, a fixed cam follower engageable by the beveled face of the cam to reciprocate the sleeve member upon rotation of the shaft, a ring-like member freely rotatable on the sleeve member and reciprocable therewith on the shaft, and a stylus adapted to operate on a recording surface and connected with the sleeve member through the ring-like member for responsive oscillation.

5. In a vehicle operation recorder, a frame, a stylus guide bar held in the frame, a stylus slide on the guide bar, a stylus carried by the slide and adapted to operate on a recording surface, an elongated rotatable shaft extending in spaced parallel relation to the guide bar, bearing means supporting the opposite end portions of the shaft in the frame, a fly-ball type speed responsive device mounted on an intermediate portion of the shaft for rotation therewith, a thrust-sleeve member mounted on one end portion of the shaft between the frame and the fly-ball type device, said shaft being provided with an abutment for limiting sliding movement of the thrust-sleeve member, links connecting the arms of the fly-ball type device with the adjacent end of the thrust-sleeve member, a cam plate having an inclined surface secured on the other end of the sleeve member for rotation therewith, cam follower means fixedly supported by the frame and arranged for engagement with the inclined surface of the cam plate, a compression spring acting between the shaft abutment and the thrust-sleeve member to urge the cam plate against the cam follower means when not held spaced therefrom by operation of the fly-ball type speed responsive device, and means connecting the stylus slide to the thrust-sleeve member for movement responsive to sliding of said sleeve member.

CLARENCE C. CHELF.

References Cited in the file of this patent

UNITED STATES PATENTS

| Number | Name | Date |
| --- | --- | --- |
| 1,061,121 | Quertier | May 6, 1913 |
| 1,196,856 | Griswold | Sept. 5, 1916 |
| 1,275,263 | Jeske | Aug. 13, 1918 |
| 1,484,125 | Frazer | Feb. 19, 1924 |
| 1,516,808 | Duncan | Nov. 25, 1924 |
| 1,992,134 | Toewe | Feb. 19, 1935 |